United States Patent
Sikka

(10) Patent No.: US 12,086,761 B2
(45) Date of Patent: Sep. 10, 2024

(54) SYSTEM AND METHOD TO COUNT AND MONITOR CONTAINERS

(71) Applicant: SENSITEL INC, Santa Clara, CA (US)

(72) Inventor: Mohinder Sikka, Fremont, CA (US)

(73) Assignee: SENSITEL INC., Santa Clara, CA (US)

( * ) Notice: Subject to any disclaimer, the term of this patent is extended or adjusted under 35 U.S.C. 154(b) by 311 days.

(21) Appl. No.: 17/781,364

(22) PCT Filed: Dec. 3, 2020

(86) PCT No.: PCT/US2020/063018
§ 371 (c)(1),
(2) Date: May 31, 2022

(87) PCT Pub. No.: WO2021/113447
PCT Pub. Date: Jun. 10, 2021

(65) Prior Publication Data
US 2023/0004927 A1    Jan. 5, 2023

Related U.S. Application Data

(60) Provisional application No. 62/943,839, filed on Dec. 5, 2019.

(51) Int. Cl.
*G06Q 10/087* (2023.01)
*G06K 7/10* (2006.01)

(52) U.S. Cl.
CPC ....... *G06Q 10/087* (2013.01); *G06K 7/10425* (2013.01)

(58) Field of Classification Search
CPC ... G06Q 10/087; G06Q 10/08; G06K 7/10425
See application file for complete search history.

(56) References Cited

U.S. PATENT DOCUMENTS 10,460,224 B1 * 10/2019 Asthana ............... G06K 7/1097
10,797,987 B1 * 10/2020 Beacham ............... H04L 41/22
(Continued)

OTHER PUBLICATIONS

F. Schwiegelshohn, T. Nick and J. Götze, "Localization based on fusion of RFID and stereo image data," 2013 10th Workshop on Positioning, Navigation and Communication (WPNC), Dresden, Germany, 2013, pp. 1-6, doi: 10.1109/WPNC.2013.6533297. (Year: 2013).*

*Primary Examiner* — Allen C Chein
*Assistant Examiner* — Aaron N Tutor

(57) ABSTRACT

A system and method to count and monitor containers at a warehouse dock is disclosed. The system includes a plurality of image capturing devices for capturing one or more images of the plurality of containers for generating a first count, a plurality of RFID readers for reading identification data of an RFID tag affixed to each of the plurality of containers for generating a second count. The system also includes a computing device configured to select the first count or the second count based on a plurality of predefined parameters, cross-check the selected count with a pre-stored count of the plurality of containers at the warehouse dock and provide a final count the containers at the warehouse dock. Manual identification and calculation of container at time of unloading the container at warehouse dock is totally eliminated.

18 Claims, 4 Drawing Sheets

(56) References Cited

U.S. PATENT DOCUMENTS

| | | | | |
|---|---|---|---|---|
| 2009/0125406 | A1* | 5/2009 | Lewis | G06K 7/10366 |
| | | | | 705/23 |
| 2009/0322489 | A1* | 12/2009 | Jones | G06V 10/24 |
| | | | | 340/10.3 |
| 2013/0307988 | A1* | 11/2013 | Hansen | H04N 7/188 |
| | | | | 348/157 |
| 2016/0035038 | A1* | 2/2016 | Perkins | G06Q 40/08 |
| | | | | 705/4 |
| 2016/0078264 | A1* | 3/2016 | Armstrong | G08B 13/2417 |
| | | | | 340/572.1 |
| 2018/0005035 | A1* | 1/2018 | Bogolea | B25J 19/023 |
| 2019/0102686 | A1* | 4/2019 | Yang | G06N 5/04 |
| 2019/0392698 | A1* | 12/2019 | Mossoba | G08B 21/02 |
| 2022/0180026 | A1* | 6/2022 | Barat | G06N 3/006 |

* cited by examiner

SYSTEM AND METHOD TO COUNT AND MONITOR CONTAINERS

FIELD OF INVENTION

Embodiments of a present disclosure relate to an automatic object/article counting system, and more particularly to a system and a method to count and monitor containers at a warehouse dock.

BACKGROUND

In a typical warehouse, loads such as goods and groceries may be received in containers such as Returnable Plastic Containers (RPCs), crates and pallets. The containers may be leased by pooling services (referred herein as 'pooler') for movement from growers to retailers. Each crate may be transferred to a retailer account when the crate hits receiving dock of the retailer. In such situations, the retailer may need to accurately track count of the crates being transferred to the retailer account. Such crates returning from stores, are stacked and then de-hired. The de-hiring is a process of returning crates to pooler washing center. The retailer may be responsible for paying the rental fee from the day crates are transferred to the retailer account to the day of the crates are de-hired. For this reason, at the receiving dock, a manual quality checker may determine the count of crates received in each pallet and sums up the total crates received for a shipment or a truck. Later, the manual quality checker may report total count of the crates to a central reconciliation manager at each warehouse. This manual count is prone to human errors and often consumes labor costs and delays in calculating the number of crates on retailer account, leading to overbilling etc.

In conventional systems, bar codes are used to identify specific locations of the load. In a typical example of such a system, the operator uses a hand-held bar code scanner to read the bar code on the loads and, in some cases, on the stock locations. Although such a system is an improvement over purely manual processes, it may be difficult to completely implement, due to the need for direct line of sight, close proximity, and proper alignment between the scanner and barcodes. It also requires the operator to participate in the load-identification process. Hence, a radio frequency identifier (RFID) based tracking system was introduced. The RFID tags containing information associated with the identities of inventory items to be tracked are attached to the inventory items. An RFID interrogator is used to detect the presence of an RFID tag and read the identification information from the tag.

Alternatively, camera-based surveillance systems were also used to track and identify the load received at the receiving dock.

However, previous approaches did not offer an efficient or ideal approach for reaching highest efficiency and accuracy level in calculation of number of the containers.

Hence, there is a need for an improved system and method to count and monitor containers at a warehouse dock to address the aforementioned issue(s).

SUMMARY

This summary is provided to introduce a selection of concepts, in a simple manner, which is further described in the detailed description of the invention. This summary is neither intended to identify key or essential inventive concepts of the subject matter nor to determine the scope of the invention.

In accordance with an embodiment of the present disclosure, a system to count and monitor containers is disclosed. The system includes one or more image capturing devices affixed to at least one of walls or on top of rolling dock doors for unloading or ceiling of a warehouse dock. The one or more image capturing devices are configured to capture one or more images of the plurality of containers located at the warehouse dock.

The system also includes a plurality of radio frequency identification (RFID) readers affixed to the warehouse dock. The plurality of radio frequency identification readers is configured to read identification data of an RFID tag affixed to each of the plurality of containers.

The system also includes a container count collection module, operable by one or more processors, configured to initiate counting of the plurality of containers, and receive a first count of the plurality of containers based on the identification data of each RFID tag, and a separate second count of the plurality of containers based on the one or more images of the plurality of containers using an image recognition technique.

The system also includes a container count selection module, operable by the one or more processors, configured to select one among the first count and the second count based on a plurality of predefined parameters. The plurality of predefined parameters includes at least one of a stacking arrangement of the plurality of containers, a type of the plurality of containers, time of RFID reads, a type of one or more items contained in the plurality of containers, a view position of the returnable object with respect to the one or more image capturing devices, presence or absence of a top cover over the plurality of containers, distance of the plurality of containers from each of the a plurality of radio frequency identification readers.

The system also includes a container count comparison module, operable by the one or more processors, configured to compare a selected one of the first count and the second count with a pre-stored count of the plurality of containers at the warehouse dock. The container count comparison module also updates a final count based on comparison.

In accordance with another embodiment of the present disclosure, the system is further configured to detect a working status of the plurality of radio frequency identification (RFID) readers and the one or more image capturing devices based on a response received, with respect to keep-alive pings sent, from each of the plurality of radio frequency identification (RFID) readers and the one or more image capturing devices.

In accordance with yet another embodiment of the present disclosure, the system is further configured to detect false positives in the first count and the second count by comparing the read of the RFID tag with a result of the image recognition technique within a dynamic singulation time for observation of a pallet consisting of the plurality of containers.

In accordance with an embodiment of the present disclosure, the system is further configured to assign a confidence score to the final count and save one or more representative images from the one or more images of the plurality of containers captured in an instance.

In accordance with an embodiment of the present disclosure, the system is further configured compare a selected one of a total of the first counts, a total of second counts, and a total of fusion counts with the pre-stored count of the plurality of pallets at the warehouse dock to identify a final count of the plurality of containers; update the final count of the plurality of containers into one of a retailer system and a pooler system; and generate a bill based on number of days for which count of containers is hired.

In accordance with another embodiment of the present disclosure, a method for counting and monitoring containers at a warehouse dock is disclosed. The method includes following steps of capturing one or more images of the plurality of containers present at a warehouse dock using one or more image capturing devices; reading identification data of an RFID tag affixed to each of the plurality of containers by a plurality of radio frequency identification (RFID) readers; receiving a first count of the plurality of containers based on the identification data of each RFID tag affixed to each of the plurality of containers, and a second count of the plurality of containers based on the one or more images of the plurality of containers; selecting one of the first count and the second count based on a plurality of predefined parameters; comparing a selected one of the total first count, the total second count and the total fusion count with a pre-stored count of the plurality of containers at the warehouse dock; and updating a final count of the plurality of containers at the warehouse dock into a crate accounting log or similar system that keeps track of days of crates hired.

In accordance with yet another embodiment of the present disclosure, the method further includes step of initiating counting of the plurality of containers, by the container count collection module, upon getting a first RFID read from one of the plurality of RFID readers, and subsequently considering the counts from one or more image capturing devices.

In accordance with an embodiment of the present disclosure, the method further includes step of detecting a working status of the plurality of radio frequency identification (RFID) readers and the one or more image capturing devices.

In accordance with another embodiment of the present disclosure, the method further includes step of detecting false positives in the container counts from RFID tags [first count] and the counts from image processing [second count].

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

BRIEF DESCRIPTION OF DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those skilled in the art having the benefit of the description herein.

DETAILED DESCRIPTION OF THE INVENTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated device, and such further applications of the principles of the invention as would normally occur to those skilled in the art are to be construed as being within the scope of the present invention. It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that one or more devices or sub-devices or elements or structures or components preceded by "comprises . . . a" does not, without more constraints, preclude the existence of other devices, sub-devices, elements, structures, components, additional devices, additional sub-devices, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this invention belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Further, in the following specification and the claims, the term "container" or "crate" or "returnable plastic containers" or "plastic reusable crates" or are used interchangeably with same meaning.

Embodiments of the present invention will be described below in detail with reference to the accompanying figures.

Figure 1:
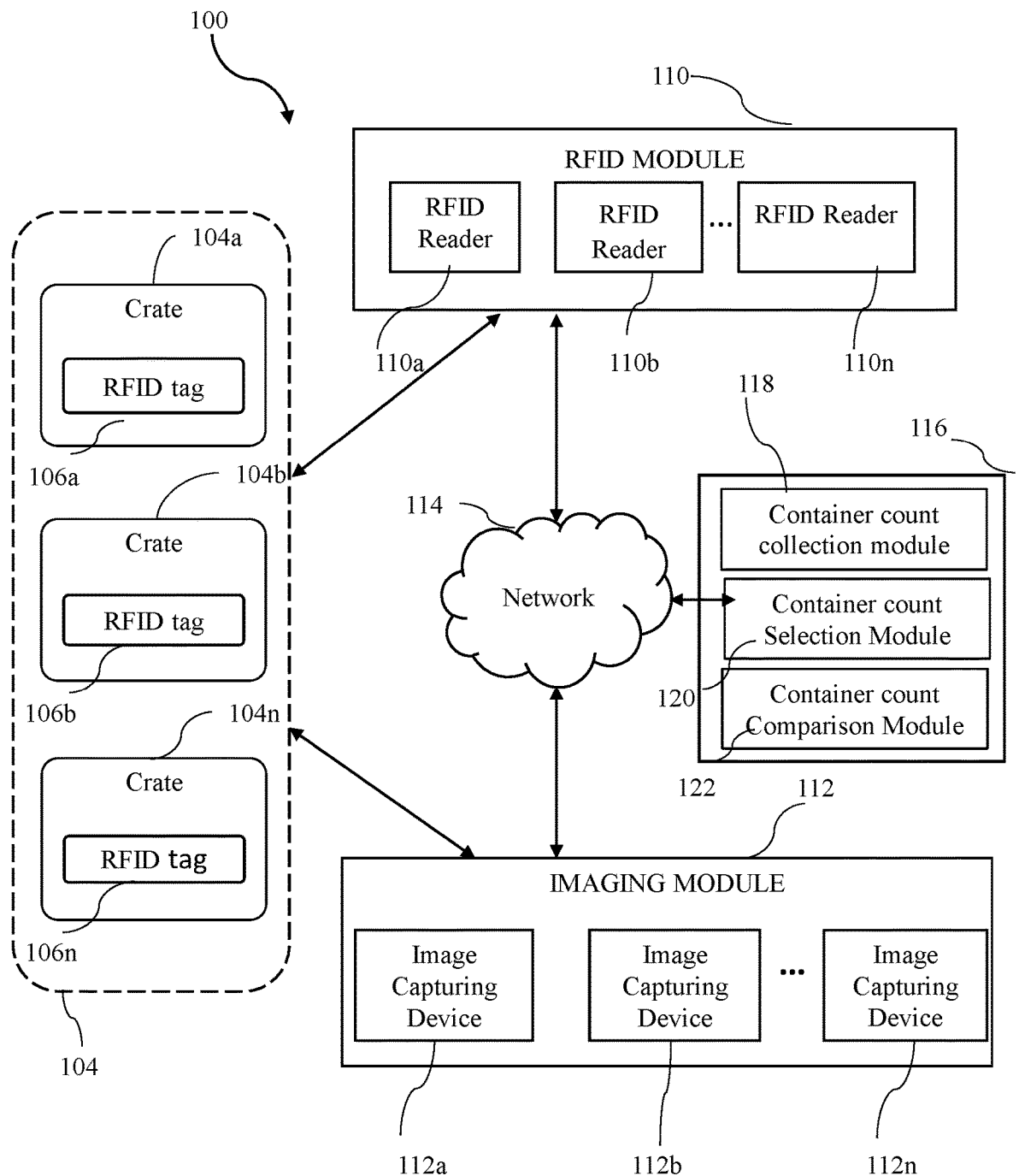
FIG. 1 is a block diagram representation of a system to count and monitor containers at a warehouse dock in accordance with an embodiment of the present disclosure.

FIG. 1 is a block diagram representation of a system 100 to count and monitor containers 104 at a warehouse dock in accordance with an embodiment of the present disclosure. As used herein, the term "warehouse dock" refers to an area of a building where goods are loaded and unloaded. The containers 104 include returnable plastic containers (RPCs), returnable plastic crates, crates, boxes, pallets, and the like. The containers are plastic reusable crates (PRC) for carrying groceries, food particles and the like, and mainly used for display on the shelf, delivering or transporting purposes. In the present context, the pallet itself may be considered as a container and counted using this invention. The pallet may be a structural platform or the structural platform with the stack of crates which allows easy handling.

In another embodiment of the invention, containers may be wooden pallets on which the plastic containers are stacked and moved. These pallets are also rented and their count is also updated in retailer and pooler systems for calculating days on hire.

In one embodiment, each of the containers 104 is tagged with a RFID tag 106. In such an embodiment, the RFID tag 106 may be a passive UHF Gen2 RFID. At time of unloading at the warehouse dock, the plurality of containers 104 are mounted over a pallet for ease of moving from one location to another. The system 100 includes one or more image capturing devices 112 and a plurality of radio frequency identification (RFID) readers 110 communicatively coupled to a computing system 116 communicatively coupled to each other via a one or more wireless network 114 to exchange data representative of functional information. The one or more wireless networks may include, but not limited to, wireless networks comprises Wi-Fi, Bluetooth®, Bluetooth Low Energy (BLE), ZigBee®, Z-Wave®, 6LoWPAN®, WiFi-Ah® (HaLow), and NB-IoT®.

In FIG. 1 the image capturing devices 112 are depicted as image capturing device 112a to 112n and are collectively referred to as an imaging module. In an embodiment, the one or more image capturing devices 112 includes camera, video recorder, and the like. In such an embodiment, the cameras are affixed to one or more side walls, or on top of the rolling dock doors or ceiling of a warehouse dock or in any combination in order to have visibility of the area designated to received pallets. In exemplary embodiment, the camera may include a fish-eye camera, 360° camera, panoramic camera, infrared IR camera, LIDAR, and the like. The one or more image capturing devices 112 are configured to capture real time one or more images of the plurality of containers located at the warehouse dock.

In an embodiment, the plurality of radio frequency identification (RFID) readers 110 (collectively referred to as RFID module) is affixed to the warehouse dock. The plurality of RFID readers 110 is configured to read identification data of the RFID tag affixed to each of the plurality of containers 104 in real time. The identification data of the RFID tag 106 may include identifiable information corresponding to each of the containers 104. In one embodiment, the RFID tag 106 may store information comprising identification number, previous container delivery details, condition parameters such as temperature excursions, best use by date and the user data. Therefore, the system is able to identify and count containers 104 based on RFID tag's 106 reads and also identify specific pallet carrying the specific containers.

In above stated exemplary embodiment, RFID readers 110 affixed to the surrounding walls, ceilings or rolling doors of the warehouse dock, retrieves data from the RFID tags after receiving communication through RFID antennas. Simultaneously, in real time both the plurality of image capturing devices 112 as well as plurality of RFID readers 110 functions together.

In an embodiment, the RFID readers 110 may range from 3 to 8 read points for reading RFID tags 106 on each side of the portal.

In an embodiment, the computing system 116 includes a container count collection module 118 configured to initiate counting of the plurality of containers 104. The counting is initiated upon getting a first RFID read from one of the plurality of RFID readers 110. Further to this, the system 116 wakes up the container count collection module 118 gathering counts from image capturing devices 112, and capturing of the one or more images of the plurality of containers 104 present at the warehouse dock starts. In an embodiment, the image capturing devices 112 are always running and processing the images, however the count is be considered only when RFID counts are also observed, otherwise their output may not be registered in the count collection module. It is understood that the plurality of RFID readers 110 also simultaneously starts reading the RFID tags 106 of the plurality of containers 104 and sends the identification data of the RFID tags 106 to the computing system 116 via the one or more network 114. The one or more captured images of the plurality of containers 104 are also sent to the computing system 116.

In an embodiment, the computing system 116 is configured to generate a first count based on received identification data of each RFID tag 106 of the plurality of containers 104 in an instant. The first count is representative of total containers 104 present at the warehouse dock within a singulation time in which a pallet of containers is observed for counting.

In another embodiment, the computing system 116 is configured to generate a second count of the plurality of containers 104 based on the one or more images of the plurality of containers using an image recognition technique. The second count is also a representative of total containers 104 present at the warehouse dock within a singulation time in which a pallet of containers is observed for counting.

The container count collection module 118 is also configured to receive the first count of the plurality of containers 104 based on the identification data of each RFID tag 106, and the second count of the plurality of containers 104 based on the one or more images of the plurality of containers.

In an embodiment, the computing system 116 includes a container count selection module 120 configured to select either the first count or the second count as the actual count of containers for a pallet, based on a plurality of predefined parameters. The plurality of predefined parameters includes a stacking arrangement of the plurality of containers, a type of the plurality of containers, time of RFID reads, a type of one or more items contained in the plurality of containers, a view position of the returnable object with respect to the one or more image capturing devices, presence of a top cover over the plurality of containers, distance of the plurality of containers from each of the plurality of RFID readers 110 or any combination thereof.

The plurality of predefined parameters includes the factors which may compromise the efficacy and accuracy of reading of the RFID tags 106 and detection of crates in the pallet from the captured images. For example, the RFID read-rates may become low due to water content of produce kept in the crate, distance from the RFID tags 106 since the RFID readers 110 cannot read the RFID tags 106 that are buried deep in the pallet full of produce. Further, the stacking arrangement of the pallets in multi-column pallets, where number of columns is more than 2 columns, the RFID reader 110 cannot read the inner columns. Moreover, in a scenario where the time of RFID reads appears to be faster than the minimum singulation time, then it is presumed that the count of the RFID tags is wrong. Therefore, upon detection of the aforementioned one or more parameters that may affect RFID read-rates, the container count selection module selects the second count for further assessment.

For this approach to work, the computing system 116 first identifies the type of pallet such as 2-column, 3-column, small pallet, double stacked, and the like. If the computing system 116 identifies the pallet to be a 3-column pallet, then container count selection module 120 takes the second count and disregards the first count, as that will be wrong.

Similarly, the parameters such as the view position of the returnable object with respect to the one or more image capturing devices, the presence of a top cover over the plurality of containers may create a situation where the pallets are occluded from the view of the camera. Therefore, upon detection of the aforementioned one or more, the container count selection module selects the second count for further assessment. For instance, if computing system 116, based on the analysis of the captured one or more images, determines that the pallet is covered with a top cover, then it will take the count from the plurality of RFID readers 110, as camera will not be able to count crates accurately due to obfuscation by the top cover.

In an embodiment, the computing system 116 also includes a container count comparison module 122 configured to compare a selected one of the first count and the second count with a pre-stored count of the plurality of containers at the warehouse dock. In an embodiment, the pre-stored count includes a historical data, a user input, and a count obtained based on a type of movables object used for moving the plurality of containers and the plurality of pallets. The historical data refers to data associated with previous counts, corrections made by a user in the count, details of situation which lead to the corrections. The user input refers to any input provided by the user monitoring counting operations, where input includes approval over the count, rejection of the count, and corrections made in the count of the plurality of containers or the plurality of pallets. The type of movables object used for moving the plurality of containers and the plurality of pallets refers to forklift, trolley, truck, and the like.

The system 100 stores a preset number of containers or pallets that may be carried or moved using each of the forklift, trolley, truck, and the like. For example, the truck may carry 50 pallets, where each of the pallet may hold 10 containers. Therefore, the preset number of the containers for truck would be 500. Hence, if one truck has unloaded, then it is expected to receive 500 containers. Similarly, if the forklift is expected to carry 5 pallets in one go, then for every entry/exit of the forklift 50 containers are expected.

In an embodiment, the pre-stored count of the plurality of containers is fed in the system beforehand by a driver or an admin operating the warehouse or through an application programming interface (API). Therefore, the system is aware of expected number of crates either being received or moving out of the warehouse. Therefore, the pre-stored count is used as a reference number for assessing the accuracy of count (either first or second) selected by the container count selection module 120.

After comparing, the container count comparison module 122 updates a final count of the plurality of containers unloaded at the warehouse dock or taken out of the warehouse The final count is transmitted to an admin or manager in charge of the warehouse, where the admin or manager is enabled to review and update the final count if it is incorrect. Further to this, the system 100 sends data of the final count to pooler systems and to retailer systems and optionally sends it to the accounting system for crates that calculates the days for which hiring fees may be due.

In a further embodiment the system 100, the container count comparison module 122 is further configured to compare a selected one of a total of the first counts, a total of second counts, and a total of fusion counts with the pre-stored count of the plurality of pallets at the warehouse dock to identify a final count of the plurality of pallets. The total of the first counts refers to all computed first counts of the plurality of containers received or moved out of the warehouse dock in a given duration based on the RFID reads. The total of second count refers to all computed second counts of the plurality of containers received or moved out of the warehouse dock in a given duration based on one or more captured images from the image capturing device 112. The total of fusion counts refers to the total running count of the containers (selected first or second count). Therefore, the system 100 computes the total number of pallets and corresponding containers received/taken out per truck in an instance.

In such an embodiment, the container count comparison module 122 is also configured to receive the input of the user regarding accuracy of the computed count. In case of any discrepancy, the user is enabled to provide correction in the computed count.

In such an embodiment, the container count comparison module 122 is also configured to update the final count of the plurality of pallets into a communicatively coupled retailer system or a pooler system. The system 100 generates a bill for numbers of days for which count of containers is hired. The number of days is counted based on the date of entry and exit of the container from the warehouse.

Figure 2:
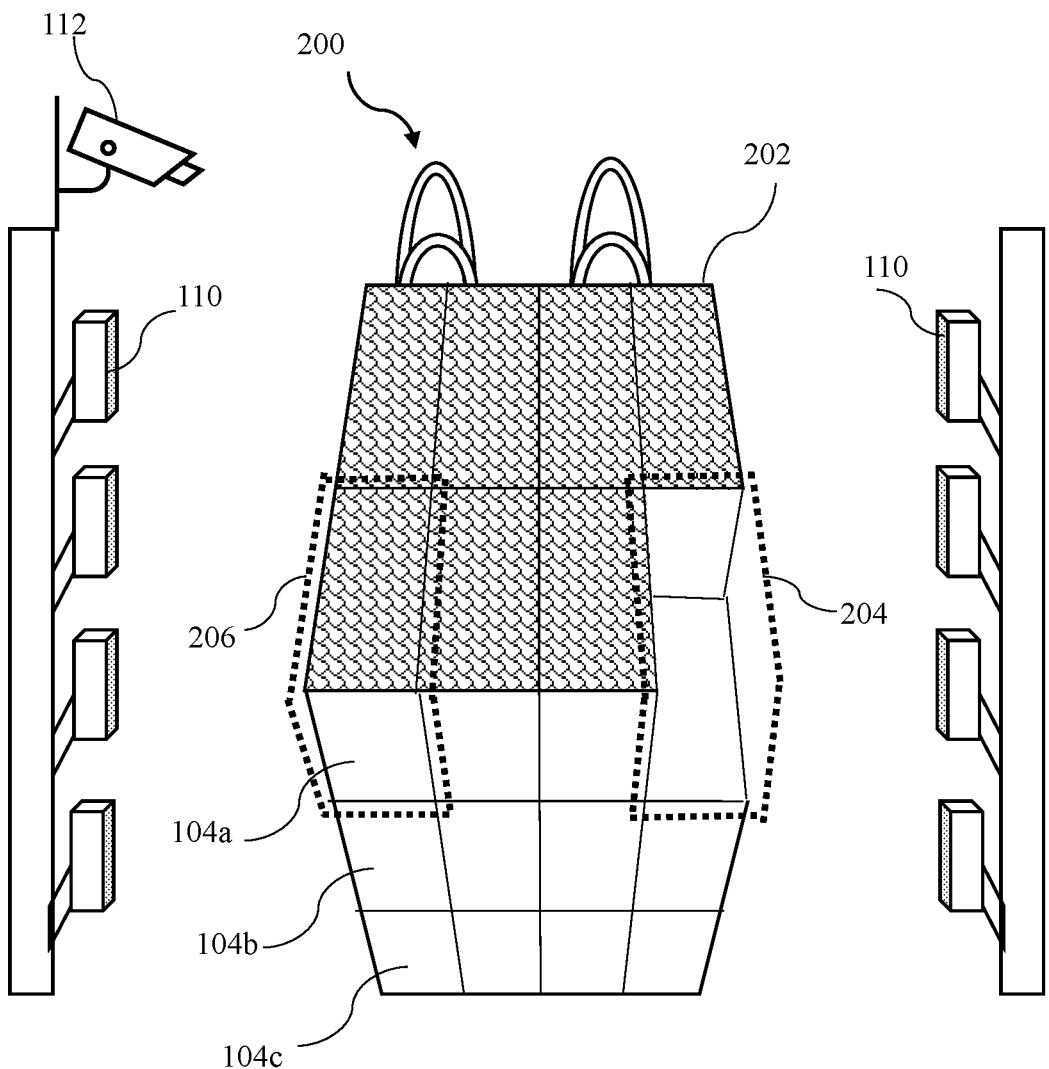
FIG. 2 is an illustration of implementation of an image recognition technique for generating a second count of the plurality of containers based on the one or more images of the plurality of containers present in a pallet in accordance with an embodiment of the present disclosure.

FIG. 2 is an illustration of implementation of an image recognition technique for generating a second count of the plurality of containers based on the one or more images of the plurality of containers 104 present in a pallet 202 in accordance with an embodiment of the present disclosure. In an embodiment, the images recognition technique includes a computer vision technique, where a machine learning based model is trained by using the plurality of images of the containers 104 and pallets 202 in various conditions. The pallet 202 shows a plurality of containers 104 stacked in eight columns with three rows in each column. stacked up over the pallet and the height of each pallet. The system 100 identifies dimension of at least one of the containers 104 and the pallet 202, thereby segments the image into various identifiable segments 206 representative of a single container. In an embodiment, the second count is generated based on the numbers of rows of container in the pallet and the height of the front mask of the pallet.

Further, the system 100 is also configured to identify a number of containers 104 pulled out or removed or absent in the stack 204. Therefore, maintains an accurate count of the containers 104.

In another embodiment, when there are multiple pallets are received at the warehouse dock but only some of which are being pulled out by a receiver, the computer vision technique automatically counts only the pallets being moved by person, thereby singulating a pallet 202 of interest.

In a further embodiment, the container count collection module 118 is also configured to detect a working status of the plurality of RFID readers and the one or more image capturing devices based on a response received, with respect to keep-alive pings sent, from each of the plurality of RFID readers and the one or more image capturing devices. The working status comprises offline, online, not-working, and non-responsive. Upon detection of the offline, the not-working, and the non-responsive status, flag is raised and an alert is sent to a concerned person for corrective measure.

The system of claim 1, wherein the container count collection module is further configured to detect false positives in the first count and the second count by comparing the read of the RFID tag with a result of the image recognition technique within a dynamic singulation time for observation of a pallet consisting of the plurality of containers. The term "singulation" as used herein refers to a method by which an RFID reader identifies a tag with a specific serial number from a number of tags in its field within a specific time. This is necessary because if multiple tags from multiple pallets respond simultaneously to a query, individual pallet cannot be counted.

The false positives may occur due to presence of objects such as cardboard boxes that may seem like plastic crates 104 (returnable assets). The container count collection module compares the RFID reads with image processing results. If RFID reads are not there and only camera results are there within a dynamic singulation time for the observation of the pallet, it is inferred that the pallet under observation is not tagged plastic crate, but a corrugated box or the cardboard box.

Further the false positives may occur due stray RFID reads from adjoining docks. The container count collection module compares the RFID reads with Camera results within the dynamically calculated singulation time. If camera results are not there and only RFID reads are there, then it is inferred that the RFID reads are actually from adjoining docks and classify them as 'Stray'.

In a further embodiment, the container count selection module 120 is also configured to assign a confidence score to the second count and save one or more representative images from the one or more images of the plurality of containers captured in an instance. The second count and saved one or more representative images and inputs made for corrections are used to train to the AI model to enhance accuracy. The Confidence score is calculated based on two factors (a) weights based on neural networking matching the image with existing segments, or (b) masks in camera image processing algorithm and statistical matching with prior observations of camera and RFID count patterns and resulting actual count value.

Figure 3:
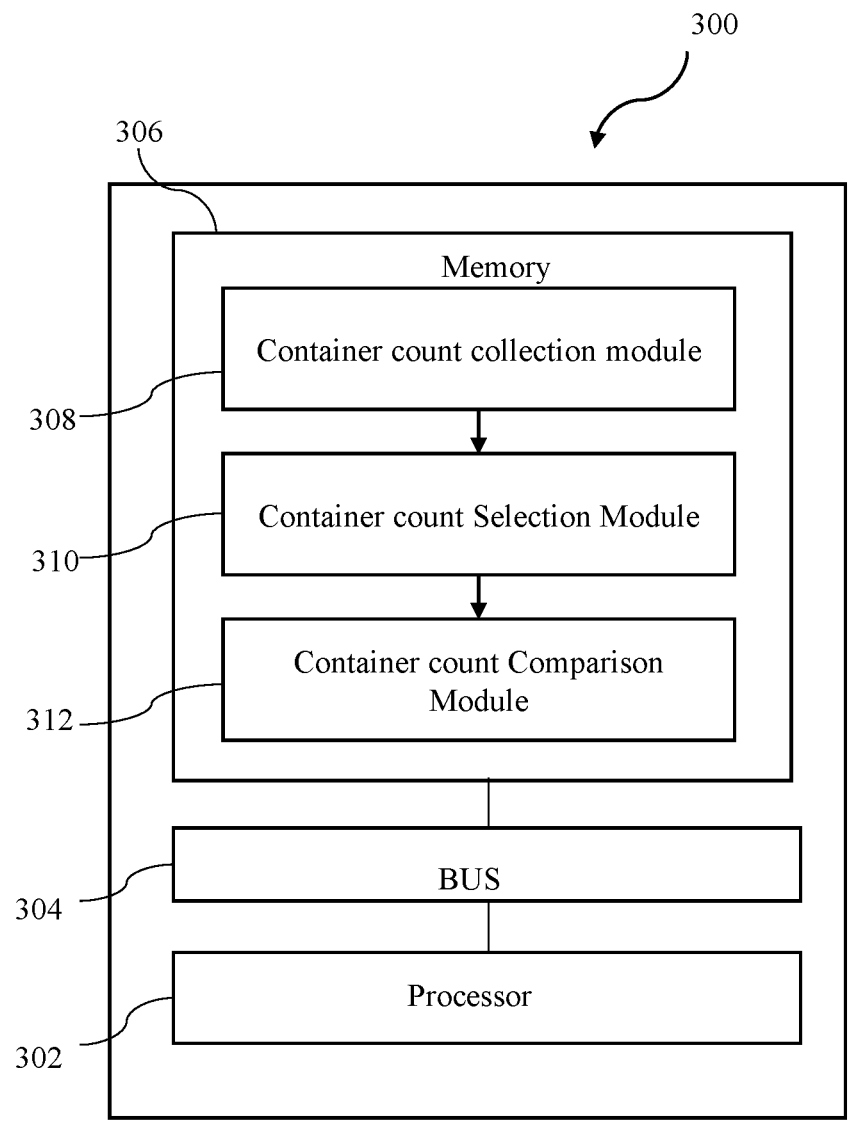
FIG. 3 is a block diagram of a computing system configured to receive a first count of the plurality of containers based on the identification data of each RFID tag, and a second count of the plurality of containers, select one of the first count and the second count for each received pallet, and update a final total count of the plurality of containers in memory in accordance with an embodiment of the present disclosure.

FIG. 3 is a block diagram of a computing system 300 configured to receive a first count of the plurality of containers based on the identification data of each RFID tag, and a second count of the plurality of containers, select one of the first count and the second count, and update a final count of the plurality of containers in memory in accordance with an embodiment of the present disclosure. The computing device 300 may include a smart phone, a mobile, a handheld device, a tablet, a laptop, a desktop, a server, a cloud and the like. The computing system 300 as disclosed herein is substantially similar to the computing system 116 of FIG. 1.

The computer system 300 includes processor(s) 302, and memory 306 coupled to the processor(s) 302 via a bus 304.

The processor 302, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 302 may also include embedded controllers, such as generic or programmable logic devices or arrays, application specific integrated circuits, single-chip computers, smart cards, and the like.

The memory 306 may be volatile memory and non-volatile memory. The memory 306 includes information gathering module 308, container count selection module 310, and assessment module 312, according to the embodiments of the present subject matter. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks®, and the like.

The memory having stored thereon the container count collection module 308, the container count selection module 310, and the container count comparison module 312 as computer-executable instruction, when executed by the processor 302, cause the functions substantially similar to the container count collection module 118, the container count selection module 120, and the container count comparison module 122 of FIG. 1, respectively.

Figure 4:
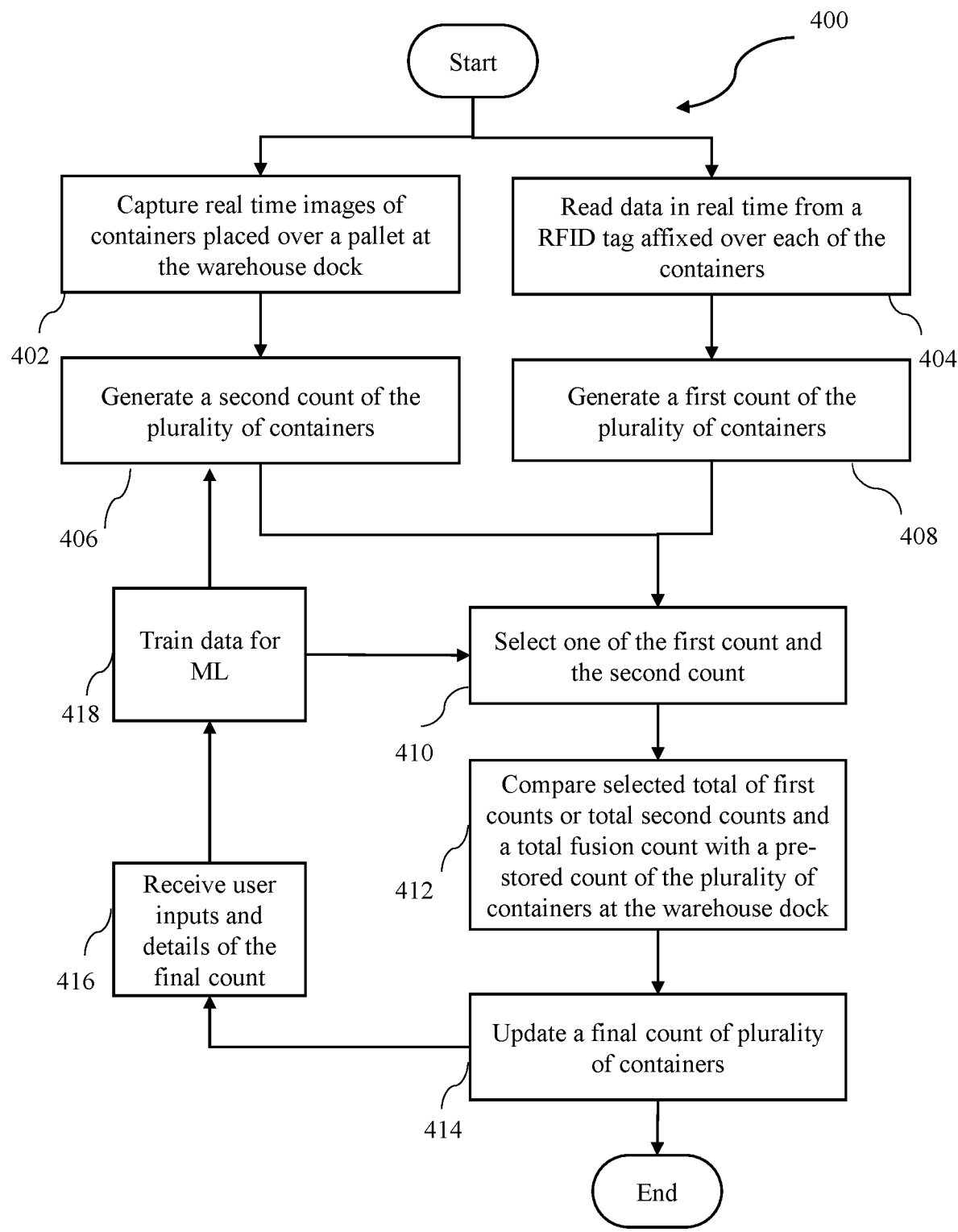
FIG. 4 is a flowchart representing the steps of a method for counting and monitoring containers at a warehouse dock in accordance with an embodiment of the present disclosure.

FIG. 4 is a flow diagram representing steps involved in a method 400 to count and monitor a plurality of containers at a warehouse dock in accordance with an embodiment of the present disclosure. The method 400 includes capturing one or more images of the plurality of containers present at a warehouse dock in step 402. The one or more images of the plurality of containers are captured in real time by one or more image capturing devices. In an embodiment, the one or more image capturing devices includes camera, video recorder, IR Camera, LIDAR and the like. In such an embodiment, the cameras are mounted either to sides of walls or on top of rolling docks or ceiling of a warehouse dock or in any combination.

The method 400 includes reading identification data of an RFID tag affixed to each of the plurality of containers in step 404. The RFID tag are read by a plurality of RFID readers mounted in the warehouse dock in real time.

The method 400 includes receiving a first count of the plurality of containers based on the identification data of each RFID tag affixed to each of the plurality of containers in step 408, and a second count of the plurality of containers based on the one or more images of the plurality of containers in step 406. The first count and the second count are received by a container count collection module operable by one or more processors and operatively coupled to the plurality of RFID readers and one or more image capturing devices via one or more wireless network. The second count of the plurality of containers is generated based on the one or more images of the plurality of containers using an image recognition technique.

The method 400 includes selecting one among the first count and the second count based on a plurality of predefined parameters in step 410. The selection of first count or the second count is performed by a container count selection module operable by the one or more processors and operatively coupled to the container count collection module. In an embodiment, the plurality of predefined parameters includes a stacking arrangement of the plurality of containers, a type of the plurality of containers, time of RFID reads, a type of one or more items contained in the plurality of containers, a view position of the returnable object with respect to the one or more image capturing devices, presence of a top cover over the plurality of containers, distance of the plurality of containers from each of the plurality of RFID readers or any combination thereof.

The method 400 includes comparing a selected total first count or a selected total second count or a total fusion count with a pre-stored count of the plurality of containers at the warehouse dock in step 412. The comparison is performed by a container count comparison module operable by the one or more processors and operatively coupled to the container count selection module. The pre-stored count of the plurality of containers may be fed in the system before starting counting. Therefore, the pre-stored count is used as a reference number for assessing accuracy of the count. This input is optional and system will work without the pre-stored count as well. In that case, it will select the highest among the total count options.

The method 400 includes updating a final count of the plurality of containers at the warehouse dock in step 414. The update is performed by the container count comparison module. The updating may include transmitting the final count to pooler system, retailer system, back end server, cloud, and the like. Effectively, the update will determine the number of days for which receiver may be billed for the hired container by the pooler.

The method steps further include, receiving the user inputs and details of the final count generated (from the step 414) in step 416. Further, using the received user inputs and the details of the final count to train the AL model for identifying the containers and pallets in step 418.

In another embodiment, the method 400 further includes initiating counting of the plurality of containers, by the container count collection module, upon getting a first RFID read from one of the plurality of RFID readers. Subsequently, waking up the one or more count collection modules using image capturing devices to initiate process of capturing of the one or more images of the plurality of containers present at the warehouse dock.

In yet another embodiment, the method 400 further includes detecting a working status of the plurality of radio frequency identification (RFID) readers and the one or more image capturing devices. The detection of a working status is performed by the container count collection module. The detecting the working status of the plurality of radio frequency identification (RFID) readers and the one or more image capturing devices includes sending keep-alive pings to the plurality of radio frequency identification (RFID) readers and the one or more image capturing devices. The detecting also includes receiving a response for the keep-alive pings from each of the plurality of radio frequency identification (RFID) readers and the one or more image capturing devices. The detecting further includes analyzing received response to detect the working status. Based on the analysis, the working status may include offline, online, not working, and non-responsive.

In an embodiment, the method 400 further includes sending alerts to one or more designated users upon detecting working status as offline or not working or non-responsive. This enables quick redressal of an issue with the process.

In another embodiment, the method 400 further includes detecting false positives in the first count and the second count. As the name suggest, the false positives are basically an error or discrepancy crept in the counting of the one or more containers due to certain external factors. The detection of false positives is performed by the container count collection module. The detecting of the false positives includes comparing the read of the RFID tag with a result of the image recognition technique within a dynamic singulation time for observation of a pallet consisting of the plurality of containers. The result of the image recognition technique comprises detection of a presence of one of the plurality of containers.

The false positive may happen due to presence of objects such as cardboard boxes that may seem like container and may get counted as a container. In such a scenario, the detection of the false positive includes comparing the RFID reads with image processing result to identify whether only camera results are there but not the RFID reads within a dynamic singulation time for the observation of the pallet. Absence of an RFID read and hence RFID tag indicates presence of a box which is not the RPC.

Moreover, the false positives may also occur due stray RFID reads from adjoining docks. In such a scenario, the detection of the false positive includes comparing the RFID reads with camera results within the dynamically calculated singulation time to identify whether only RFID reads are there but not the camera results within a dynamic singulation time for the observation of the pallet. The camera result includes detection of a presence of one of the plurality of containers in the captured one or more images by the image recognition technique.

Thereby, the plurality of the RFID readers and the one or more image capturing units work in tandem to remove the false positives.

Table 1 depicts functioning of the count collection module [118] and the count selection module

TABLE 1

| Time | Pallet # | Source | Type | Count | Operation |
| --- | --- | --- | --- | --- | --- |
| 12:20:20 pm | 11111 | RFID | 2C | 42 | Edit |
| 12:18:20 pm | 11110 | Camera | Tall | 76 | Edit |

In Table 1, two separate pallets are shown to be singulated (within a singulation time of 120 seconds). The first pallet 11111 is counted as count of 42 crates. In this case, first count came in as 42 and second count came in as 48. The system identified, via one or more images, the pallet as a 2C. Based on pre-fed preference, the count selection module 120 selects RFID as more accurate source for the Type 2C and RFID data is used as the final count for this pallet.

Similarly, in the pallet 11110, the camera 112 is selected as the source by Count Selection Module 120 as camera 112 is more accurate for Tall Pallets with count of Crates as 76. This final count is stored in the count selection module.

In another example of counting and selection of the first count or second count, the RFID count received is 364 for a pallet, the camera count received 345 for the same pallet, whereas the fusion count by summing up counts for each selected count for the pallet is 364. In this case, preset value of expected count is not provided. However, since fusion count and RFID count are matching, that said value is given preference and total final count is set at 364. In another case, where preset value for expected count is provided as 370. In that case, the final count be set to 365, which is closer of the three total counts to the expected count.

During tests, the present system and method to count and monitor containers at a warehouse dock had yielded high read-rates with an aggregate accuracy higher than 98%, faster speed of counting and reduced manual effort and times for counts. Thereby, providing an efficient and cost-effective solution to the problems existing in the conventional crate counting approaches.

Present disclosure of a system to count and monitor containers at a warehouse dock provides an automatic counting system. Here, the system discloses an easy implementation of image capturing devices and RFID readers for counting of containers on a warehouse dock. As two mechanisms are simultaneously used for counting, the efficiency of result also increases. The rented containers are tracked and returned on time to the logistic companies.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system to count and monitor a plurality of containers, comprising:
    one or more image capturing devices, wherein the one or more image capturing devices are configured to capture one or more images of a plurality of containers located at the warehouse dock;
    a plurality of radio frequency identification (RFID) readers affixed to the warehouse dock, wherein the plurality of radio frequency identification readers is configured to read identification data of an RFID tag affixed to each of the plurality of containers;
    a container count collection module, operable by one or more processors, configured to initiate counting of the plurality of containers, and receive a first count of the plurality of containers based on the identification data of each RFID tag, and a second count of the plurality of containers based on the one or more images of the plurality of containers using an image recognition technique;
    a container count selection module, operable by the one or more processors, configured to select one of the first count and the second count based on a plurality of predefined parameters;
    a container count comparison module, operable by the one or more processors, configured to compare a selected one of the first count and the second count with a pre-stored count of the plurality of containers at the warehouse dock, and update a final count of the plurality of containers based on comparison; and
    wherein the container count collection module is configured to initiate counting of the plurality of containers upon getting a first RFID read from one of the plurality of RFID readers and subsequently waking up the count collection module for counting using one or more image capturing devices.

2. The system of claim 1, wherein the plurality of containers comprises a plurality of pallets.

3. The system of claim 1, wherein the plurality of predefined parameters for selecting one of the first count and the second count comprises at least one of a stacking arrangement of the plurality of containers, a type of the plurality of containers, time of RFID reads, a type of one or more items contained in the plurality of containers, a view position of the returnable object with respect to the one or more image capturing devices, presence of a top cover over the plurality of containers, distance of the plurality of containers from each of the plurality of RFID readers.

4. The system of claim 1, wherein the pre-stored count comprises a historical data, a user input, and a count obtained based on a type of movables object used for moving the plurality of containers and the plurality of pallets.

5. The system of claim 1, wherein the container count collection module is further configured to detect a working status of the plurality of RFID readers and the one or more image capturing devices based on a response received, with respect to keep-alive pings sent, from each of the plurality of RFID readers and the one or more image capturing devices.

6. The system of claim 5, wherein the working status comprises offline, online, not-working, and non-responsive.

7. The system of claim 1, wherein the container count collection module is further configured to detect false positives in the first count and the second count by comparing the read of the RFID tag with a result of the image recognition technique within a dynamic singulation time for observation of a pallet consisting of the plurality of containers.

8. The system of claim 1, wherein the container count selection module is further configured to assign a confidence score to the final count and save one or more representative images from the one or more images of the plurality of containers captured in an instance.

9. The system of claim 1, wherein the container count comparison module is further configured to
    compare a selected one of a total of the first counts, a total of second counts, and a total of fusion counts with the pre-stored count of the plurality of pallets at the warehouse dock to identify a final count of the plurality of pallets;
    update the final count of the plurality of pallets into one of a retailer system and a pooler system; and
    generate a bill based on number of days for which count of containers is hired.

10. A method to count and monitor a plurality of containers, comprising:
    capturing, by one or more image capturing devices, one or more images of the plurality of containers and a plurality of pallets present at a warehouse dock;
    reading, by a plurality of radio frequency identification (RFID) readers, identification data of an RFID tag affixed to each of the plurality of containers and the plurality of pallets;
    receiving, by a container count collection module, a first count of the plurality of containers based on the identification data of each RFID tag affixed to each of the plurality of containers, and a second count of the plurality of containers based on the one or more images of the plurality of containers using an image recognition technique;

selecting, by a container count selection module, one of the first count and the second count based on a plurality of predefined parameters and a confidence level assigned to the first count and the second count;

comparing, by a container count comparison module, a selected one of the total first count and the total second count, and a total fusion count with a pre-stored count of the plurality of containers at the warehouse dock;

updating a final count, by the container count comparison module, of the plurality of containers at the warehouse dock to one of a retailer and a pooler billing system for counting days of hire for the plurality of containers; and wherein the container count collection module is configured to initiate counting of the plurality of containers upon getting a first RFID read from one of the plurality of RFID readers and subsequently waking up the count collection module for counting using one or more image capturing devices.

11. The method of claim 10, wherein the plurality of predefined parameters for selecting one of the first count and the second count comprises at least one of a stacking arrangement of the plurality of containers, a type of the plurality of containers, time of RFID reads, a type of one or more items contained in the plurality of containers, a view position of the returnable object with respect to the one or more image capturing devices, presence of a top cover over the plurality of containers, distance of the plurality of containers from each of the a plurality of radio frequency identification readers.

12. The method of claim 10, wherein the pre-stored count comprises a historical data, a user input, and a count obtained based on a type of movables object used for moving the plurality of containers and the plurality of pallets.

13. The method of claim 10, further comprising detecting, by the container count collection module, a working status of the plurality of radio frequency identification (RFID) readers and the one or more image capturing devices.

14. The method of claim 13, wherein the detecting the working status of the plurality of radio frequency identification (RFID) readers and the one or more image capturing devices comprises:

sending keep-alive pings to the plurality of radio frequency identification (RFID) readers and the one or more image capturing devices;

receiving a response for the keep-alive pings from each of the plurality of radio frequency identification (RFID) readers and the one or more image capturing devices;

and analyzing received response to detect the working status.

15. The method of claim 13, wherein the working status comprises offline, online, not working, and non-responsive.

16. The method of claim 10, further comprising detecting, by the container count collection module, false positives in the first count and the second count.

17. The method of claim 16, wherein the detecting of the false positives comprises comparing the read of the RFID tag with a result of processing of one or more images by the image recognition technique within a dynamic singulation time for observation of a pallet consisting of the plurality of containers.

18. The method of claim 17, wherein the result of the image recognition technique comprises detection of a presence of one of the plurality of containers.

* * * * *